Figure 1:
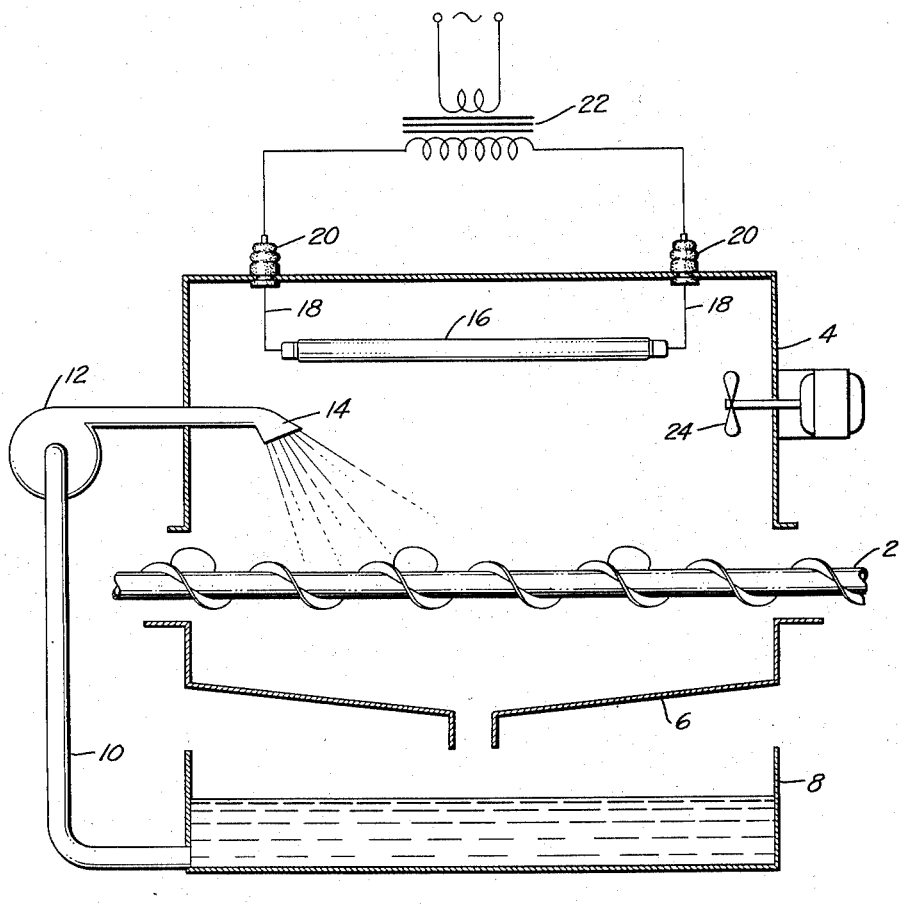

Feb. 9, 1954 H. A. MULVANY 2,668,772
BLEACHING PROCESS
Filed April 5, 1951

INVENTOR.
HARRY A. MULVANEY.
BY
His Attorney.

Patented Feb. 9, 1954

2,668,772

UNITED STATES PATENT OFFICE 2,668,772

BLEACHING PROCESS

Harry A. Mulvany, Berkeley, Calif.

Application April 5, 1951, Serial No. 219,487

7 Claims. (Cl. 99—230)

This invention relates to a process for bleaching natural articles and particularly relates to a process for treating eggs to obtain an improved appearance and to impart preservative qualities.

In the marketing of eggs, premium prices are obtained for uniform packs of eggs having all white or all brown shells, to the considerable price disadvantage of packs wherein eggs having shells of a creamy or light tan color were mixed with white eggs, for the creamy or light tan eggs appear soiled or dirty.

An object of the present invention is to provide a process for treating egg shells and wherein the shells of such eggs are bleached to a uniform white color.

Another object of the present invention is to provide a process for sterilizing the shells of eggs and removal therefrom of infectious materials.

A further object of the present invention is to provide a process for bleaching the shells of eggs which does not affect deleteriously the egg content inside the shell.

The invention possesses other objects and features of advantage, some of which, together with the foregoing, will be set forth in the following description of the preferred form of the invention. It is to be understood, however, that variations in the process as described hereunder may be adopted within the scope of the invention as set forth in the claims.

It has been heretofore known that hydrogen peroxide, $H_2O_2$, can be used to bleach egg shells and that it will not penetrate the shells so as to adversely affect the content and quality of the egg. As this process has been previously practiced, the eggs are conveyed through a chamber wherein the eggs are sprayed with, or exposed to the vapor of, hydrogen peroxide. This process as heretofore used, is very effective in bleaching eggs and produces eggs having a uniform white color. However, the process suffers from the defect that it is rather slow, requiring from twelve to forty-eight hours. The exposure of the eggs to the peroxide for this long period of time requires that all of the processing equipment be of a large size in order that an economical number of eggs can be processed in any given time period. It is obvious that a process employing a shorter residence time would offer a considerable economic advantage inasmuch as the equipment could be made much smaller, the buildings necessary to house the equipment could be made smaller and the inventory of goods in process greatly reduced.

I have now discovered that if eggs are exposed to the simultaneous action of hydrogen peroxide and to ultra violet light, the processing time for bleaching the eggs can be greatly reduced. For instance, the process without the use of ultra violet light requires from 12 to 48 hours while equivalent results are obtained by using the combination of hydrogen peroxide and ultra violet light in as little as 30 minutes.

It has also been found that by increasing the temperature the time required for bleaching can be shortened materially. However, eggs suffer rapid deterioration when exposed to slightly elevated temperatures and coagulation occurs at temperatures as low as 58.5° C. Therefore, in carrying out the process I prefer to work at room temperature or a temperature slightly elevated above this and to avoid a temperature high enough to cause any coagulation of the egg.

Since the improved bleaching process has a relatively short residence time, it can be advantageously combined with other egg treating processes so that the eggs move in a continuous stream through the various treating steps. For instance, one could first pass the eggs through a dry or wet sander for the purpose of cleaning them, then through the process of the present invention wherein the eggs are bleached and on through a dryer and then through a process where a preservative coating such as oil is applied.

It is advantageous to clean the egg shells before they are subjected to the process of the present invention for the reason that eggs ordinarily have a thin layer of protein and fatty material which covers the normal hard mineral portion of the shell. This coating frequently includes catalase, an enzyme which destroys peroxide. The ultra violet light has a bacteriacidal action so that the catalase is less important when ultra violet light is used than in the old process of merely treating the eggs with hydrogen peroxide. Nevertheless, in many instances it has been found advantageous to clean the eggs, such as by wet sanding, prior to the bleaching.

Referring now to the drawing, there is shown a bleaching apparatus in diagrammatic form. The equipment includes a conveyor 2 for conveying eggs through a chamber consisting of an upper portion 4, and a lower portion 6. Conveyor 2 may consist of a single or double spiral which rotates and draws the eggs through the chamber. If a single spiral is used, the egg will be supported between the rotating spiral and a rod which is parallel therewith. Rotation of the spiral conveyor 2 will not only cause the eggs to be drawn forward through the treating chamber, but will rotate the eggs at the same time so that all parts of the eggs are exposed to the action of the ultra violet light. Any type of conveyor can be substituted for the conveyor shown at 2, so long as the conveyor chosen is one which rotates the eggs as well as propels them through the chamber. The bottom of chamber 6 is of generally sloping shape, as is shown, so that any liquid peroxide which runs off the eggs will be delivered to the sump 8. A pipe 10 and a pump 12 have been provided to convey the peroxide solution from the sump 8 to a spraying nozzle 14. Preferably, nozzle 14 contains a series of very fine holes so that the peroxide solution is atomized and vaporized as soon as it leaves the nozzle. Mounted in the upper portion of chamber 4 is a source of ultra violet light 16. The source 16 illustrated in the drawing is a cold quartz lamp containing mercury vapor, but as will be apparent hereafter, any other source of ultra violet light may be substituted. The lamp 16 may be supported by the wires 18 which carry the current to the lamp and the wires pass through suitable insulators 20 in the cover 4 to a suitable source of electricity 22.

The container 4 and 6 is preferably made as vapor-tight as is practical in order that a high humidity condition will be maintained within the chamber. If desired, a fan 24 may be employed to secure uniform distribution of the hydrogen peroxide vapor throughout the chamber. Although in the diagrammatic representation of the apparatus only a single quartz light is used, the conveyor would ordinarily be made longer than is illustrated in commercial practice and a number of the quartz lights would be used. The conveyor would be driven at a suitable speed so that the eggs remain in the chamber for the requisite time period, as will be explained. Ordinarily the time of treatment will vary from about 10 to about 30 minutes; light eggs will require the shorter time, while dark eggs will require a longer time. With most eggs, a residence time of 15 minutes is sufficient.

Hydrogen peroxide solutions of various strengths may be used to obtain the desired bleaching of the color of the egg shells. Strengths ranging from 3% to 90% have been found satisfactory. The usual commercial grade of hydrogen peroxide having a concentration of about from 30% to 35% can be used to advantage for it is readily available and conveniently controlled in use. It has been found advantageous to keep the eggs constantly moist with the hydrogen peroxide while being exposed to the ultra violet light.

It is preferred to expose the eggs to the vapor of hydrogen peroxide, but other methods can be used. The eggs may be sprayed with or dipped in hydrogen peroxide solution and thereafter kept in a chamber having a high humidity and a source of ultra violet light. Although in my preferred embodiment I have shown the simultaneous application of the peroxide and ultra violet light, this is not necessary; it is only necessary to expose the eggs to the action of the ultra violet light while they are in contact with the hydrogen peroxide.

Various sources of ultra violet light have been used and have been found to have just about equal effectiveness. One type which is frequently used is the mercury vapor arc quartz lamp illustrated in the drawing. This particular type of lamp gives light in the wave length range of from 2780 to 2246 Angstrom units. However, with more powerful ultra violet lamps such as the mercury vapor arc type which wave lengths from 5721 to 2819 Angstrom units, the same stimulating effect on the hydrogen peroxide was found. Experiments have indicated that the lamp used should have a high erythermal flux. The erythermal flux is defined as that quantity of radiant energy which produces as much temporary reddening of the skin as 10 microwatts of energy at 2967 Angstrom units. In other words, the frequency which has been found most helpful in accelerating the action of the hydrogen peroxide is substantially the same frequency which causes reddening of the skin. In addition to the mercury vapor arc, other sources of ultra violet light such as a spark discharge or open arc may be used. However, the quartz light is preferred because of its high efficiency and ready availability coupled with the fact that it does not produce too much heat within the treatment chamber. The quantity of ultra violet light which is used is not critical as any exposure of the eggs while they are moist with hydrogen peroxide will tend to shorten the processing time.

It has been found that bacteria such as pseudomonas are completely destroyed when subjected to the combined treatment of hydrogen peroxide and ultra violet light. This organism is the one responsible for many eggs spoiling in storage and it is apparent that the invention is useful for not only the bleaching of eggs, but for sterilizing them and controlling the bacteria with which they are contaminated.

Although this invention has been particularly described in relation to the bleaching of eggs, it is also applicable to other products and particularly food products where one wants to bleach the product and/or sterilize it. Typical products which may be benefited are nuts, oranges, apples, grains and seeds.

The following examples illustrated preferred methods of carrying out the invention:

*Example 1.*—Eggs were passed along a conveyor through a chamber and were sprayed at room temperature with a solution containing 35% hydrogen peroxide. The spraying nozzle had very fine apertures so that the peroxide solution was converted into a vapor almost immediately. Suspended within the chamber in close proximity to the eggs was a quartz ultra violet lamp. This lamp was twelve inches long, and operated at 250 volts, with 10 ampers current. After fifteen minutes exposure to the hydrogen peroxide vapor and ultra violet light, eggs which initially had a dark brown color were bleached completely white and were indistinguishable from white hen eggs.

*Example 2.*—To show the bactericidal effect of the treatment, a number of eggs were infected with pseudomonas bacteria and divided into two lots, one of which was treated in the manner of Example 1 and the other of which was left untreated as a control. The eggs were then stored under identical conditions for three weeks. At the end of this time it was found that all of the eggs which had been given the treatment with ultra violet light were in good condition, while all the control eggs were sour.

I claim:

1. The process of bleaching shell eggs which consists in maintaining said shell eggs in contact with hydrogen peroxide while irradiating the shell eggs with ultra violet radiation for a period sufficient to ensure a desired color change, said ultra-violet radiation being used as a bactericidal agent and also to accelerate the action of the hydrogen peroxide.

2. The process of bleaching shell eggs which consists in placing said shell eggs in an atmosphere of hydrogen peroxide vapor and subjecting the shell eggs simultaneously to the action of ultra-violet light, said ultra violet light being used as a bactericidal agent and also to accelerate the action of the hydrogen peroxide.

3. The process of bleaching shell eggs consisting of contacting the shell egg with an atmosphere of hydrogen peroxide and simultaneously exposing the eggs to ultra violet light while rotating the eggs so that all parts of the shell are exposed to the light, said ultra-violet light being used as a bactericidal agent and also to accelerate the action of the hydrogen peroxide.

4. The process of bleaching shell eggs which consists in bathing the eggs in hydrogen peroxide and exposing the wet eggs to the action of ultra-violet light, said exposure being for about from 10 minutes to about one-half hour, said ultra-violet light being used as a bactericidal agent and also to accelerate the action of the hydrogen peroxide.

5. The process of claim 4 in which the hydrogen peroxide has a concentration of from 3% to 90%.

6. The process of claim 4 in which the hydrogen peroxide has a concentration of about 35%.

7. The process of bleaching shell eggs which comprises placing said shell eggs in an atmosphere of hydrogen peroxide, rotating said eggs in the presence of ultra violet light wherein the ultra violet light is strongest in the region of 2967 Angstrom units said ultra-violet light being used as a bactericidal agent and also to accelerate the action of the hydrogen peroxide.

HARRY A. MULVANY.

References Cited in the file of this patent

UNITED STATES PATENTS

| Number | Name | Date |
| --- | --- | --- |
| 1,381,079 | Sutherland | June 7, 1921 |
| 1,412,523 | Hochstadter | Apr. 11, 1922 |
| 1,945,102 | Tranin et al. | Jan. 30, 1934 |
| 1,975,991 | Tranin et al. | Oct. 9, 1934 |
| 2,059,787 | Gow | Nov. 3, 1936 |
| 2,161,045 | Hirschkind | June 6, 1939 |
| 2,413,631 | Ingle | Dec. 31, 1946 |
| 2,438,168 | Hearst | Mar. 23, 1948 |